(12) United States Patent
Hasegawa et al.

(10) Patent No.: US 7,950,334 B2
(45) Date of Patent: May 31, 2011

(54) GROUND COIL DEVICE FOR MAGNETIC LEVITATION RAILWAY AND METHOD FOR MANUFACTURE THEREOF

(75) Inventors: Tomomi Hasegawa, Chiba (JP); Futoshi Yonekawa, Chiba (JP); Akihiro Fujita, Hyogo (JP); Yoshihiro Jizo, Hyogo (JP); Yoshifumi Itabashi, Hyogo (JP); Keizo Yoshikawa, Tochigi (JP); Tsuyoshi Fujimoto, Tokyo (JP); Hiromori Ishihara, Aichi (JP); Nobuhiko Mizuno, Shizuoka (JP)

(73) Assignees: Idemitsu Kosan Co., Ltd., Tokyo (JP); Mitsubishiki Denki Kabushiki Kaisha, Tokyo (JP); Central Japan Railway Company, Nagoya-shi (JP)

( * ) Notice: Subject to any disclaimer, the term of this patent is extended or adjusted under 35 U.S.C. 154(b) by 650 days.

(21) Appl. No.: 11/912,242

(22) PCT Filed: Mar. 30, 2006

(86) PCT No.: PCT/JP2006/306725
§ 371 (c)(1), (2), (4) Date: Apr. 16, 2008

(87) PCT Pub. No.: WO2006/114984
PCT Pub. Date: Nov. 2, 2006

(65) Prior Publication Data
US 2009/0078150 A1    Mar. 26, 2009

(30) Foreign Application Priority Data
Apr. 22, 2005   (JP) ................. 2005-125335

(51) Int. Cl.
*B29C 45/14*    (2006.01)

(52) U.S. Cl. ................. 104/286; 264/272.19
(58) Field of Classification Search ............ 104/286, 104/294; 264/272.15, 272.19, 278
See application file for complete search history.

(56) References Cited

U.S. PATENT DOCUMENTS

| 4,581,411 A | 4/1986 | Liang et al. |
| 5,178,072 A * | 1/1993 | Suzuki .................. 104/286 |
| 7,578,242 B2 * | 8/2009 | Itabashi et al. ........... 104/286 |
| 2005/0115059 A1 * | 6/2005 | Fuseya et al. ............. 29/606 |

FOREIGN PATENT DOCUMENTS

| JP | 06 237570 | 8/1994 |
| JP | 07 184363 | 7/1995 |
| JP | 09 070106 | 3/1997 |
| JP | 10 315267 | 12/1998 |
| JP | 11 113107 | 4/1999 |

* cited by examiner

*Primary Examiner* — S. Joseph Morano
*Assistant Examiner* — Zachary Kuhfuss
(74) *Attorney, Agent, or Firm* — Oblon, Spivak, McClelland, Maier & Neustadt, L.L.P.

(57) ABSTRACT

A ground coil device for a magnetic levitation railway that can be manufactured with a high productivity and exhibit less fluctuation in strength, reduced weight, and good recyclability, and a process for manufacturing the device. The ground coil device includes a coil conductor covered with a thermoplastic resin molding material containing 100 parts by mass of a thermoplastic resin, from 20 to 200 parts by mass of an inorganic filler, and from 0 to 25 parts by mass of an elastomer. A process for producing the ground coil device for magnetic levitation railway includes filling the thermoplastic resin molding material into a cavity of a metal mold into which the coil conductor is previously inserted, by an injection molding method, to obtain an integrally molded product.

9 Claims, 4 Drawing Sheets

Fig. 1

Background Art

Fig. 2

Background Art

GROUND COIL DEVICE FOR MAGNETIC LEVITATION RAILWAY AND METHOD FOR MANUFACTURE THEREOF

TECHNICAL FIELD

The present invention relates to ground coil devices for magnetic levitation railway and a process for manufacturing the devices, and, more particularly, to ground coil devices for magnetic levitation railway which include a coil conductor covered with an insulating material and are affixed to a side wall of a concrete track wherein the insulating material is made of a thermoplastic resin molding material having a specific composition, and which are capable of being manufactured with a high productivity and have a reduced weight and a good recyclability; and a process for manufacturing the ground coil devices for magnetic levitation railway with a high productivity by forming an integrally molded product using an injection-molding method.

BACKGROUND ART

In magnetic levitation railways, ground coils are continuously mounted along a guideway thereof to levitate, guide and propel a vehicle. The ground coils each having a predetermined length corresponding to a pole pitch of a superconducting magnet of the vehicle are continuously disposed at a predetermined pitch (a longitudinal distance between centers of adjacent superconducting coils in the same superconducting magnet).

As to the ground coils for magnetic levitation railway, there are conventionally known only inventions relating to coil devices produced using a thermosetting resin by a sheet molding compound (SMC) method or a reaction injection molding (RIM) method, and processes for production thereof.

Figure 1:
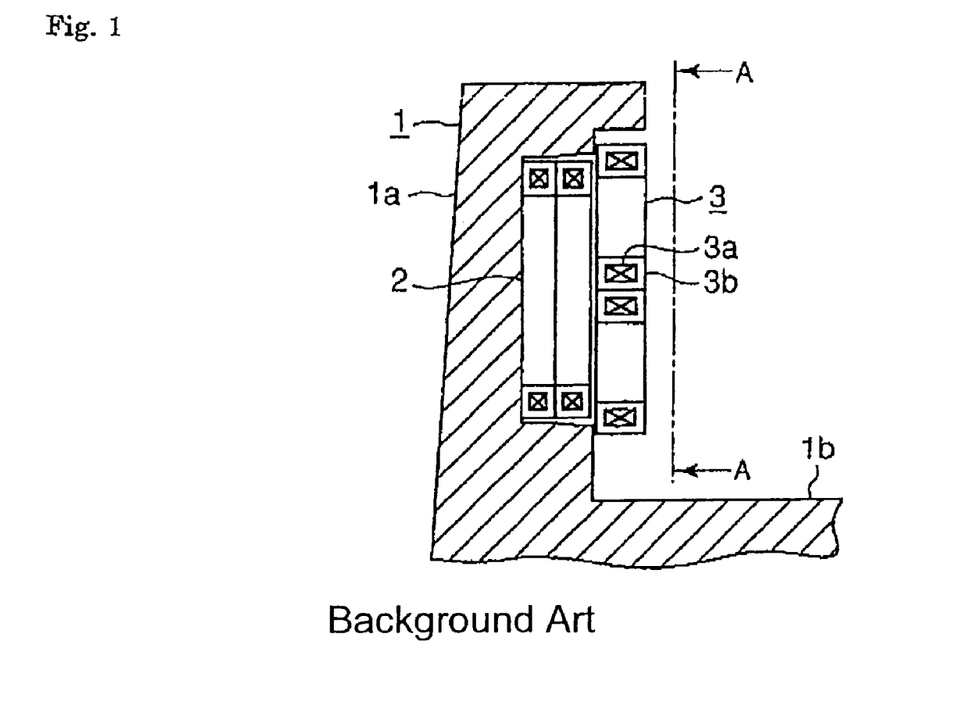
FIG. 1 is a sectional view showing a conventional ground coil device for magnetic levitation railway.
Figure 2:
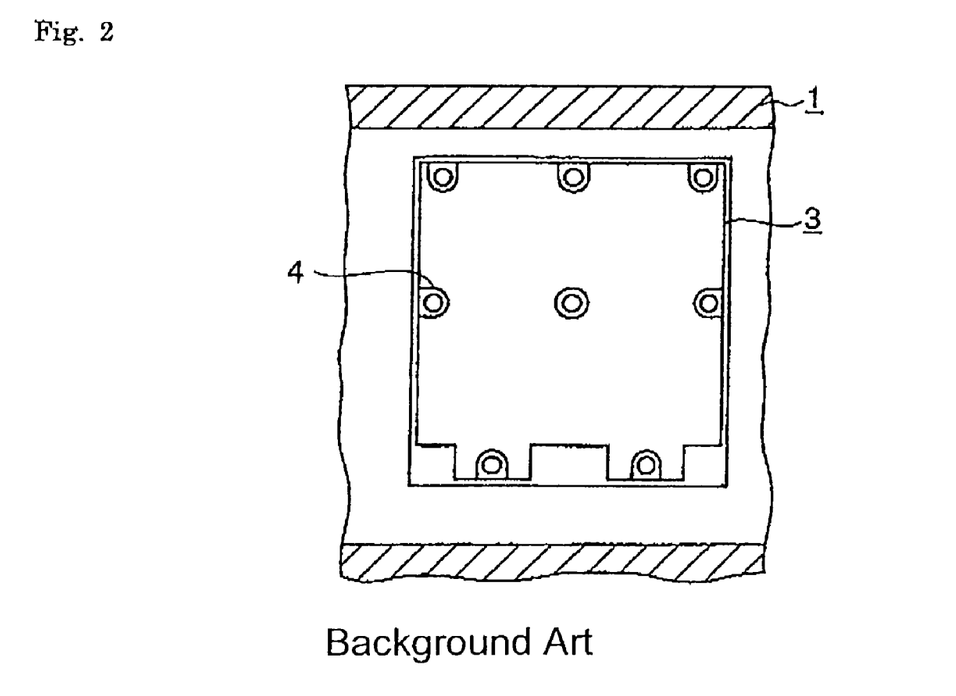
FIG. 2 is a front view of the ground coil device as viewed from the direction of the line A-A of FIG. 1.

For example, FIG. 1 is a cross-sectional view showing a conventional ground coil device for magnetic levitation railway, and FIG. 2 is a front view as viewed from the direction of the line A-A of FIG. 1 (for example, refer to JP 3301892).

In FIGS. 1 and 2, a concrete track 1 having a U-shaped section is constituted of a side wall 1a and a bottom wall 1b. A propulsion coil 2 for generating a propulsion force of a vehicle (not shown) is affixed to the side wall 1a, and a levitation coil 3 for levitating and guiding the vehicle is also affixed to the side wall 1a at a position nearer to a center of the concrete track 1 than that of the propulsion coil 2. Meanwhile, reference numeral 4 denotes a tightening means composed of a fixing bolt and a washer for affixing the levitation coil 3 to the side wall 1a.

A conductor of the propulsion coil 2 is covered with a sheath made of an epoxy resin, whereas an outer periphery of a conductor 3a of the levitation coil 3 is covered with a sheath made of SMC. Meanwhile, the SMC is obtained, for example, by compounding a thermosetting polyester resin and a glass fiber base material and forming the resultant mixture into a sheet having a thickness of about 2 mm. The glass fibers used in the SMC generally have such a composition that those fibers having a length of 3 to 6 mm are contained therein in an amount of about 30% by mass, in view of a good fluidity thereof within a mold upon heat- and pressure-molding. However, in the present invention, in order to avoid occurrence of such portions where a density of the glass fibers is lacking and fluctuation of mechanical strength in the obtained products due to undesirable flow of the resin upon molding, continuous glass fibers in the form of a vortex are used in the SMC.

Also, in JP 3121718, using an insulting sheath made of an epoxy resin, a ground coil device is molded by a cast molding method. In the invention described in JP 3121718, in order to avoid induction of eddy current in a metal bush and occurrence of peeling between the metal bush and the epoxy resin and eliminate a step for removal of burrs of the epoxy resin, a conductive coating film is formed on an outer peripheral surface of the metal bush, or a shape of the metal bush is variously designed.

In addition, in JP 10-315267A, a coil device is molded by a reaction injection molding method using a norbornene-based polymer as a material of an insulating sheath thereof. In the invention described in JP 10-315267A, in order to avoid displacement of winding coils inserted into a metal mold from predetermined positions in the metal mold, a previously shaped reinforcing mat is placed within the metal mold.

As described above, with respect to the ground coil devices for magnetic levitation railway, there have been conventionally proposed various inventions relating to processes for manufacturing the devices by compression molding, cast molding or reaction injection molding of thermosetting resins.

However, upon molding the thermosetting resins, irrespective of the molding method used therefor, a very long molding cycle time (SMC: 30 min or more; RIM: 1 h or more) as well as post-treatments such as removal of burrs are inevitably required, resulting in poor productivity. In addition, when subjecting the SMC to compression molding, coarse and dense distribution of the glass fibers in the SMC tends to occur due to flowing of the material, thereby causing such a problem that the obtained molded product tends to be fluctuated in strength depending upon positions thereof. On the other hand, in the RIM, it is required to insert a previously shaped mat into a metal mold, resulting in still poorer productivity.

Further, the glass fibers are hardly penetrated into thin-wall rib portions, resulting in low reliability in strength of such a rib structure. Therefore, in order to ensure a sufficient strength required for the coil devices, it is required to increase a thickness of the resin portion, so that the resultant devices inevitably suffer from increase in weight.

Furthermore, the thermosetting resins inherently have a poor recyclability.

DISCLOSURE OF THE INVENTION

Problem to be Solved by the Invention

The present invention has been made in view of the above conventional problems. An object of the present invention is to provide a ground coil device for magnetic levitation railway which is affixed to a side wall of a concrete track, and can be manufactured with a high productivity and can exhibit a less fluctuation in strength, a reduced weight and a good recyclability.

Means for Solving Problem

As a result of intensive and extensive researches for developing ground coil devices for magnetic levitation railway which exhibit the above preferred characteristics, the inventors have found that the above object can be achieved by covering a coil conductor with a thermoplastic resin molding material having a specific composition, and further that when the thermoplastic resin molding material is filled in a cavity of a metal mold into which the coil conductor, preferably the coil conductor and a metal bush, are previously inserted, and then molded together therewith into an integral body within the metal mold by using an injection molding method, the ground coil devices for magnetic levitation railway can be manufactured with a good productivity.

The present invention has been accomplished on the basis of the finding.

Thus, the present invention provides:

(1) A ground coil device for magnetic levitation railway which is affixed to a side wall of a concrete track, including a coil conductor covered with a thermoplastic resin molding material containing (A) 100 parts by mass of a thermoplastic resin, (B) from 20 to 200 parts by mass of an inorganic filler, and (C) from 0 to 25 parts by mass of an elastomer.

(2) The ground coil device for magnetic levitation railway as described in the above aspect (1), wherein the thermoplastic resin as the component (A) of the thermoplastic resin molding material is a polyarylene sulfide-based resin.

(3) The ground coil device for magnetic levitation railway as described in the above aspect (1) or (2), wherein the inorganic filler as the component (B) of the thermoplastic resin molding material has a fiber shape, a spherical shape, a plate shape or an amorphous shape.

(4) The ground coil device for magnetic levitation railway as described in any one of the above aspects (1) to (3), wherein the device has a generally flat surface on a side facing a vehicle and a swelled surface corresponding to a shape of the coil conductor on a side facing the side wall, and includes ribs disposed in an inner diameter portion of the coil conductor.

(5) The ground coil device for magnetic levitation railway as described in any one of the above aspects (1) to (4), wherein a metal bush is embedded in the device at a position corresponding to a fitting bolt for mounting the device to the side wall of the concrete track.

(6) The ground coil device for magnetic levitation railway as described in the above aspect (5), wherein the metal bush is provided at opposite ends thereof with jaws having different diameters from each other.

(7) The ground coil device for magnetic levitation railway as described in the above aspect (5) or (6), wherein the device has a boss-shaped portion corresponding to the fitting bolt for mounting the device to the side wall of the concrete track, and 8 or more ribs each having a thickness of from 1.5 to 10 mm at a tip end thereof and a height of 30 mm or more which are connected to the boss-shaped portion.

(8) A process for manufacturing the ground coil device for magnetic levitation railway as described in any one of the above aspects (1) to (4), including the step of filling the thermoplastic resin molding material into a cavity of a metal mold into which the coil conductor is previously inserted, by an injection molding method, to obtain an integrally molded product.

(9) A process for manufacturing the ground coil device for magnetic levitation railway as described in any one of the above aspects (5) to (7), including the step of filling the thermoplastic resin molding material into a cavity of a metal mold into which the coil conductor and the metal bush are previously inserted, by an injection molding method, to obtain an integrally molded product.

(10) The process as described in the above aspect (9), wherein a gate is disposed at a position where the metal bush is inserted into the metal mold, and has a disk shape.

(11) The process as described in any one of the above aspects (8) to (10), wherein the process is conducted using an injection molding machine equipped with a mold clamping device that is operated in a direction parallel with a gravity direction.

(12) The process as described in any one of the above aspects (8) to (11), wherein the coil conductor includes coil wires fixedly bonded together with a thermosetting resin.

(13) The process as described in any one of the above aspects (8) to (12), wherein the coil conductor is fixed in the metal mold by pins capable of advancing into and retreating from the metal mold.

(14) The process as described in the above aspect (13), wherein the pins capable of advancing into and retreating from the metal mold are each fitted at a tip end thereof with an insulating member.

(15) The process as described in the above aspect (13) or (14), wherein after the thermoplastic resin molding material is filled into the cavity of the metal mold but before a temperature of the thermoplastic resin molding material is decreased below a temperature at which the molding material is flowable, the pins are retreated from the metal mold, and portions from which the pins are retreated are filled with the thermoplastic resin molding material to produce a stepless molded product.

EFFECT OF THE INVENTION

In accordance with the present invention, there is provided a ground coil device for magnetic levitation railway which includes a coil conductor covered with an insulating material and is affixed to a side wall of a concrete track, in which by using a thermoplastic resin molding material having a specific composition as the insulating material, the ground coil device can be manufactured with a high productivity and can exhibit a reduced weight and a good recyclability.

In addition, the ground coil device for magnetic levitation railway can be manufactured with a high productivity by the process including the step of filling the thermoplastic resin molding material into a cavity of a metal mold into which the coil conductor, or the coil conductor and the metal bush, are previously inserted, by an injection molding method, to obtain an integrally molded product.

EXPLANATION OF REFERENCE NUMERALS

1: Concrete track; 1*a*: Side wall; 1*b*: Bottom wall; 2: Propulsion coil; 3: Levitation coil; 3*a*: Conductor; 3*b*: Sheath; 4: Tightening means; 10, 20, 30: Coil device; 11: Coil conductor; 12, 23, 32: Metal bush; 13: Resin material; 21: Resin surface on a front surface side; 22: Inner diameter portion of coil conductor; 24: Boss-shaped resin material portion; 25: Traces of pins; 26, 33: Connecting portion to electric power source; 31: Surface of hardened SMC material.

BEST MODE FOR CARRYING OUT THE INVENTION

First, the ground coil device for magnetic levitation railway according to the present invention is explained. The ground coil device for magnetic levitation railway according to the present invention (hereinafter occasionally referred to merely as a "ground coil device") includes a coil conductor covered with a thermoplastic resin molding material, and is affixed onto a side wall of a concrete track.

The thermoplastic resin molding material used in the present invention contains (A) a thermoplastic resin, (B) an inorganic filler, and optionally (C) an elastomer.

The thermoplastic resin as the component (A) of the thermoplastic resin molding material is not particularly limited, and various resins may be used therefor. Examples of the thermoplastic resin include syndiotactic polystyrene-based resins, polycarbonate-based resins, polyamide-based resins, polyethylene phthalate-based resins, polyether imide-based resins, polyamide imide-based resins, polyether ether ketone-based resins, polyethylene naphthalate-based resins, polyether sulfone-based resins, polysulfone-based resins and polyarylene sulfide-based resins. Among these thermoplastic resins, the polyarylene sulfide-based resins are preferred in view of well-controlled balance between strength and flame retardance of the resultant ground coil device and costs for materials, etc.

The polyarylene sulfide (PAS)-based resins are polymers containing a repeating unit represented by the structural formula: —Ar—S— wherein Ar is an arylene group, in an amount of 70 mol % or more. Typical examples of the polyarylene sulfide (PAS)-based resins include polyphenylene sulfide (PPS)-based resins containing 70 mol % or more of a repeating unit represented by the following structural formula (I):

[Chemical Formula 1]

wherein $R^1$ is a substituent group selected from the group consisting of an alkyl group having 6 or less carbon atoms, an alkoxy group, a phenyl group, a carboxylic group/a metal salt thereof, an amino group, a nitro group, a halogen atom such as fluorine, chlorine and bromine; m is an integer of from 0 to 4; and n represents an average polymerization degree ranging from 1.3 to 30.

As the PAS-based resins, according to the production processes therefor, there are generally known two types of resins, i.e., resins of one type having a substantially linear structure and substantially no branched nor crosslinked structure, and resins of the other type having a branched or crosslinked structure. In the present invention, both types of the PAS-based resins may be used without particular limitations. Examples of the PAS-based resins suitably used in the present invention include homopolymers and copolymers containing a p-phenylene sulfide repeating unit in an amount of preferably 70 mol % or more and more preferably 80 mol % or more. When the amount of the repeating unit in the PAS-based homopolymers and copolymers is less than 70 mol %, the resultant PAS-based resins tend to be deteriorated in crystallinity inherent to crystalline polymers, thereby failing to attain sufficient mechanical properties. Examples of the copolymerizable constitutional unit of the PAS-based resins include a m-phenylene sulfide unit, an o-phenylene sulfide unit, a p,p'-diphenylene ketone sulfide unit, a p,p'-diphenylene sulfone sulfide unit, a p-biphenylene sulfide unit, a p,p'-diphenylene ether sulfide unit, a p,p'-diphenylene methylene sulfide unit, a p,p'-diphenylene cumenyl sulfide unit and a naphthylene sulfide unit.

The PAS-based resins may be produced, for example, by subjecting a dihalo aromatic compound and a sulfur source to polycondensation reaction in an organic polar solvent by a suitable method known per se. The melt viscosity of the PAS-based resins used in the present invention is not particularly limited, and is preferably in the range of from 5 to 120 Pa·s as measured at 300° C. and 200 s$^{-1}$.

In the thermoplastic resin molding material, the inorganic filler is used as the component (B). In particular, in the case where the PAS-based resins having a poor toughness are used as the thermoplastic resin (A), the effect of blending the inorganic filler in the molding material can be highly exhibited, resulting in considerable improvement in dimensional accuracy, strength and toughness of the resultant molded product.

The shape of the inorganic filler is not particularly limited. Examples of the shape of the inorganic filler include a fiber shape, a spherical shape, a plate shape and an amorphous shape.

In order to enhance a strength and a toughness of the resultant molding material, the inorganic filler of a fiber shape is preferably used. Examples of the fiber-shaped inorganic filler include glass fibers, boron fibers, silicon carbide fibers, aluminum borate whiskers, zinc oxide whiskers, calcium silicate whiskers, calcium carbonate whiskers, potassium titanate whiskers and silicon carbide whiskers. Among these inorganic fillers, preferred are glass fibers.

The fiber-shaped inorganic filler is preferably of such a configuration having a large aspect ratio from the viewpoint of enhancing a strength and a toughness of the resultant molding material. Also, the glass fibers are preferably used in the form of a chopped strand or still finer milled fibers.

In order to enhance a dimensional accuracy, the inorganic filler having not a fiber shape but a spherical shape, a plate shape or an amorphous shape is preferably used because of a less anisotropic contraction thereof. Examples of the inorganic filler having a spherical shape, a plate shape or an amorphous shape include silica, alumina, calcium carbonate, mica, talc, kaolin, clay, calcium sulfate, barium sulfate, hollow glass and glass flakes.

In the present invention, for the purpose of improving a wettability or an adhesion to the thermoplastic resin, the inorganic filer may be previously treated with a surface modifier. Examples of the surface modifier include silane-based coupling agents, titanate-based coupling agents, aluminum-based coupling agents, chromium-based coupling agents, zirconium-based coupling agents and borane-based coupling agents. Among these coupling agents, preferred are silane-based coupling agents and titanate-based coupling agents, and more preferred are silane-based coupling agents.

Specific examples of the suitable silane-based coupling agents include triethoxysilane, vinyl tris(β-methoxyethoxy) silane, γ-methacryloxypropyl trimethoxysilane, γ-glycidoxypropyl trimethoxysilane, β-(3,4-epoxycyclohexyl)ethyl trimethoxysilane, N-β-(aminoethyl)-γ-aminopropyl trimethoxysilane, N-β-(aminoethyl)-γ-aminopropylmethyl dimethoxysilane, γ-aminopropyl triethoxysilane, N-phenyl-γ-aminopropyl trimethoxysilane, γ-mercaptopropyl trimethoxysilane and γ-chloropropyl trimethoxysilane. Among these silane-coupling agents, preferred are aminosilanes such as γ-aminopropyl trimethoxysilane and N-β-(aminoethyl)-γ-aminopropyl trimethoxysilane.

In the present invention, these inorganic fillers as the component (B) may be used alone or in combination of any two or more thereof. The content of the inorganic filler in the molding material may be selected from the range of from 20 to 200 parts by mass on the basis of 100 parts by mass of the thermoplastic resin as the component (A). When the content of the inorganic filler lies within the above specified range, the effect of improving a toughness, a strength and a dimensional accuracy of the resultant molded product can be suitably exhibited, and further the obtained molding material can exhibit a good moldability. The content of the inorganic filler in the molding material is preferably from 30 to 160 parts by mass and more preferably from 40 to 130 parts by mass on the basis of 100 parts by mass of the thermoplastic resin as the component (A).

In the thermoplastic resin molding material of the present invention, the elastomer is used as the component (C). The elastomer exhibits an effect of suppressing occurrence of cracks on the resultant molded product owing to residual stress upon molding.

The elastomer used in the present invention is not particularly limited. Examples of the elastomer include thermoplastic elastomers such as olefin-based elastomers, polyamide-based elastomers, polyester-based elastomers, diene-based elastomers, urethane-based elastomers, silicone-based elastomers, vinyl chloride-based elastomers and fluororesin-based elastomers.

The olefin-based elastomers are constituted from a polyolefin such as polypropylene and polyethylene as a hard segment, and EPDM, etc., as a soft segment. The polyamide-based elastomers are polyamide-based block copolymers constituted from a polyamide hard segment and the other soft segment bonded thereto. Typical examples of the soft segment in the polyamide-based elastomers include polyalkyleneoxides (containing an alkyl group having 2 to 6 carbon atoms). Examples of the polyamide component as the hard segment include polyamide 6, polyamide 66, polyamide 6.12, polyamide 11 and polyamide 12. Examples of the polyether component as the soft segment include polyoxyethylene glycol, polyoxypropylene glycol and polyoxytetramethylene glycol.

As the polyester-based elastomers, there may be used multi-block polymers constituted from a high-crystalline aromatic polyester as the hard segment and an amorphous polyether or an aliphatic polyester as the soft segment. Examples of the hard segment in the polyester-based elastomers include terephthalic acid-based crystalline polyesters such as polyethylene terephthalate, polybutylene terephthalate and polycyclohexane dimethylene terephthalate. Examples of the soft segment in the polyester-based elastomers include aliphatic polyethers such as polytetramethylene ether glycol, polypropylene glycol and polyethylene glycol; and aliphatic polyesters obtained from aliphatic dicarboxylic acids and glycols such as ethylene glycol, propylene glycol, butanediol, pentanediol, neopentyl glycol, hexanediol, octanediol and decanediol.

Examples of the diene-based elastomers include natural rubbers, polybutadiene, polyisoprene, styrene-butadiene block copolymers (SBR), hydrogenated styrene-butadiene block copolymers (SEB), styrene-butadiene-styrene block copolymers (SBS), hydrogenated styrene-butadiene-styrene block copolymers (SEBS), styrene-isoprene block copolymers (SIR), hydrogenated styrene-isoprene block copolymers (SEP), styrene-isoprene-styrene block copolymers (SIS) and hydrogenated styrene-isoprene-styrene block copolymers (SEPS), as well as granular elastomers of a core/shell type such as butadiene-acrylonitrile-styrene core/shell rubbers (ABS), methyl methacrylate-butadiene-styrene core/shell rubbers (MBS), octyl acrylate-butadiene-styrene core/shell rubbers (MABS), alkyl acrylate-butadiene-acrylonitrile-styrene core/shell rubbers (AABS) and butadiene-styrene core/shell rubbers (SBR) and modified rubbers thereof.

The urethane-based elastomers are elastomers containing an urethane group (—NH—COO—) in a molecule thereof, and may be produced by an intermolecular reaction between three components including (1) a polyol (long-chain diol), (2) a diisocyanate and (3) a short-chain diol. The polyol and the short-chain diol are subjected to addition reaction with the diisocyanate, thereby producing a linear polyurethane. Among these components, the polyol constitutes a soft portion (soft segment) of the elastomer, whereas the diisocyanate and the short-chain diol constitute a hard portion (hard segment) of the elastomer. Examples of types of the urethane-based elastomers include (a) a caprolactone type (polylactone ester polyols obtained by ring opening of caprolactone), (b) an adipic acid type (=adipate type; adipic acid ester polyols obtained from adipic acid and glycol), and (c) a PTMG (polytetramethylene glycol) type (=ether type; polytetramethylene glycol obtained by ring opening of tetrahydrofuran).

The silicone-based elastomers are preferably those obtained by copolymerizing a polyorganosiloxane with a crosslinking agent. Examples of the polyorganosiloxane include hexamethyl cyclotrisiloxane, octamethyl cyclotetrasiloxane, decamethyl cyclopentasiloxane, dodecamethyl cyclohexasiloxane, trimethyltriphenyl cyclotrisiloxane and tetramethylytetraphenyl cyclotetrasiloxane. Examples of the crosslinking agent include trifunctional or tetrafunctional siloxane-based crosslinking agents. Specific examples of the crosslinking agents include trimethoxymethyl silane, triethoxyphenyl silane, tetramethoxysilane, tetraethoxysilane and tetrabutoxysilane.

Strictly speaking, the vinyl chloride-based elastomers have no structure composed of a hard segment and a soft segment, and, therefore, belong to not elastomers but rather plastics. However, the vinyl chloride-based elastomers exhibit a rubber elastic behavior as well as a good oil resistance and a good weather resistance.

The fluororesin-based elastomers are elastomers constituted from a fluororubber as a soft segment and a fluororesin as a hard segment, and exhibit properties of thermoplastic elastomers as well as a more excellent abrasion resistance than vulcanized rubbers.

In the present invention, as the component (C), various elastomers as described above may be used alone or in combination of any two or more thereof. The content of the elastomer as the component (C) in the molding material may be selected from the range of from 0 to 25 parts by mass on the basis of 100 parts by mass of the thermoplastic resin as the component (A). When the content of the elastomer lies within the above specified range, the resultant molded product can be prevented from suffering from occurrence of cracks owing to residual stress upon molding without damaging inherent properties of the thermoplastic resin as the component (A). The content of the elastomer as the component (C) in the molding material is preferably from 5 to 20 parts by mass.

The thermoplastic resin molding material used in the present invention may also contain, in addition to the above components (A) to (C), various additives, if required, unless the addition of these additives adversely affects the object of the present invention. Examples of the additives include antioxidants, weather-resisting agents, flame retardants, plasticizers and colorants.

The thermoplastic resin molding material may be produced by blending the components (A) to (C) together with various optional additives, if required, and then subjecting the obtained mixture, for example, to melt kneading.

The melt kneading may be conducted by ordinary known methods. However, in any methods, it is required that the respective components are uniformly mixed and dispersed in the resin. The melt kneading may be usually performed by suitably using a twin-screw extruder, a single-screw extruder, etc. Although the melt kneading conditions are not particularly limited, the use of extremely high temperature or extremely long residence time is preferably avoided to suppress decomposition or foaming of various additives optionally added. When using a polyphenylene sulfide-based resin as the thermoplastic resin, the melt-kneading temperature is usually from 270 to 370° C. and preferably from 290 to 340° C.

The ground coil device of the present invention may be manufactured by covering the coil conductor with the thus prepared thermoplastic resin molding material.

When mounting the ground coil device of the present invention to a side wall of a concrete track, the surface of the ground coil device on the side of a vehicle is preferably flat in order to suppress occurrence of wind noise. For this reason, the ground coil device preferably has a flat surface on the side facing the vehicle and a swelled surface formed into a shape of the coil conductor on the side facing the side wall. Also, holes as traces of pins for fixing the coil conductor in a metal mold which are formed upon production of the below-mentioned integrally molded product, are preferably closed.

Further, the thickness of a surface resin portion of the ground coil device is preferably 10 mm or less in order to shorten a cooling time and enhance a dimensional accuracy upon injection-molding the thermoplastic resin molding material. However, when the thickness of the whole resin portion is 10 mm or less, the strength is partially lacking. Therefore, ribs are usually disposed, in particular, on an inner diameter side of the coil conductor where a high strength is required.

The ground coil device of the present invention is affixed to the side wall of the concrete track by means of bolts. The bolt-fixed portions of the ground coil device are most likely to be exposed to a tightening force of the bolts, a stress generated by expansion and contraction of the ground coil device owing to temperature change, or an electromagnetic force generated in the coils, and are therefore required, in particular, to have a high strength. Consequently, a metal bush is preferably embedded in the respective bolt-fixed portions.

The metal bush is preferably provided at opposite ends thereof with jaws having different diameters from each other in order to enhance a bonding force to the thermoplastic resin molding material (hereinafter occasionally referred to merely as a "resin material") and prevent the metal bush from being removed from a body of the ground coil device. When applying a force to the metal bush in such a direction as to pull out or push out the metal bush from the body of the ground coil device, a shear stress is exerted on a plane connecting between the jaws formed on the metal bush. In order to scatter the shear stress around, the plane onto which the shear stress is exerted may be broadened. To this end, it is effective to increase a length of the metal bush, a diameter of the respective jaws and further a difference in diameter between the jaws. However, since the thickness of the ground coil device is preferably small, the increase in length of the metal bush associated with the increase in thickness of the device is unpractical, and, therefore, the increase in diameter of the jaws formed on the metal bush is more effective.

In addition, when the difference in diameter between the jaws and the other portions of the metal bush is considerably large, the thickness of the resin material portion in the vicinity of the meal bush in the ground coil device is also considerably varied, i.e., the thickness of the resin material portion other than the jaws of the metal bush becomes extremely large. The resin material portion having a large thickness tends to suffer from large contraction when cooled upon molding, resulting in formation of voids and, therefore, deteriorated strength in the vicinity of the metal bush.

Therefore, the metal bush preferably has such a shape that the thickness of the resin material portion is not extremely increased even in the vicinity of the metal bush. When the diameter of the larger-diameter jaw is represented by a and the diameter of the portion other than the jaws of the metal bush is represented by b, the ratio of a to b (a/b) is preferably 2.0 or less (a/b≦2.0), preferably 1.6 or less (a/b≦1.6) and more preferably 1.4 or less (a/b≦1.4).

Also, in the case where a polyphenylene sulfide-based resin having a low toughness is used as the thermoplastic resin of the thermoplastic resin molding material, the respective corner portions of the metal bush are preferably prevented from making a sharp angle. Therefore, all of the corner portions of the metal bush preferably has R of 1 or more, more preferably 2 or more and still more preferably 5 or more.

Figure 3:
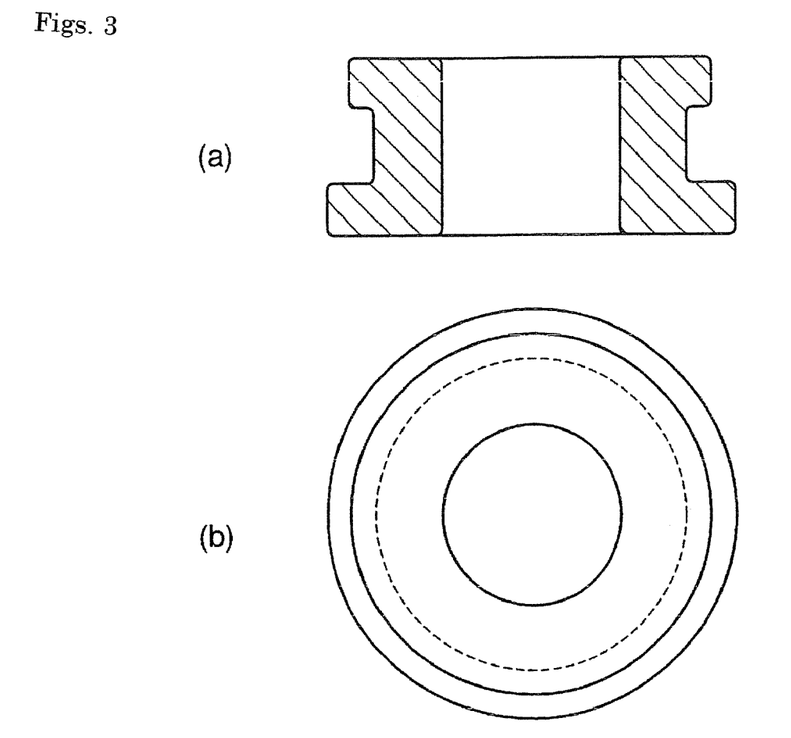
FIG. 3 are a side view and a plan view showing an example of a metal bush used in the present invention.

FIG. 3 show an example of the metal bush used in the present invention in which FIG. 3(a) shows a side view thereof and FIG. 3(b) shows a plan view thereof. Meanwhile, the material of the metal bush is usually a stainless steel (for example, SUS304).

In the ground coil device of the present invention, the portion to which especially large load is applied is a bolt-tightening portion in the vicinity of the metal bush. Therefore, a boss-like portion corresponding to the respective fixing bolts for mounting the device to the side wall of the concrete track, i.e., the boss-like resin material portion in the vicinity of the metal bush, is preferably connected with 8 or more ribs each having a tip end thickness of from 1.5 to 10 mm and preferably from 3 to 8 mm and a height of 30 mm or more which is preferably not higher than a height of a coil portion of the device.

When the tip end thickness of the respective ribs is 1.5 mm or more, it is not required to apply an excessive filling pressure to a molten resin for penetrating the resin into fine delicate portions, which is advantageous from the viewpoint of energy efficiency. In addition, even the molten resin having an insufficient fluidity can be filled up to the tip end of the respective ribs On the other hand, when the tip end thickness of the respective ribs is 10 mm or less, it is not necessary to increase a weight of the respective ribs for achieving the aimed strength, resulting in reduction in weight of the device. In addition, no profile upon cooling and solidifying the resin remains at a thick-wall portion of the resin material, thereby preventing occurrence of warpage and deformation, or cracks owing to a residual stress therein.

Root portions of the ribs, portions where the ribs are contacted with the boss-like resin material portion and portions where the ribs are contacted with an inner wall surface of the coil conductor, preferably have R of 5 or more and more preferably 10 or more in order to avoid concentration of stress thereto.

In accordance with the following process of the present invention, the above ground coil device for magnetic levitation railway according to the present invention can be manufactured with a good productivity.

Next, the process for manufacturing the ground coil device according to the present invention is described.

In the process of the present invention, in order to manufacture the ground coil device with an enhanced productivity, there is employed not a compression molding method or a reaction injection molding method but an ordinary injection molding method.

More specifically, in the process of the present invention, the ground coil device is manufactured by (1) filling the above thermoplastic resin molding material into a cavity of a metal mold into which the coil conductor is previously inserted, by an injection molding method, to obtain an integrally molded product, or (2) filling the above thermoplastic resin molding material into a cavity of a metal mold into which the coil conductor and the metal bush are previously inserted, by an injection molding method, to obtain an integrally molded product. These injection molding methods may also be conducted by an injection compression molding method in order to reduce a pressure within the metal mold upon molding, lessen damage to the inserts, or suppress warpage and deformation owing to a residual stress in the resin.

In the method (2), as described above as to the ground coil device of the present invention, since the bolt-tightening portion for mounting the ground coil device to the side wall of the concrete track is required to have an especially high strength, the metal bush is inserted together with the coil conductor into a portion of the metal mold corresponding to the bolt-tightening portion to obtain an integrally molded product.

In the methods (1) and (2), the coil conductor or both the coil conductor and the metal bush are inserted into the metal mold, and then the thermoplastic resin molding material as an insulating material is filled into the metal mold to obtain an integrally molded product, thereby enabling the ground coil device having a high reliability from the viewpoint of strength to be manufactured with an enhanced productivity.

When using a polyphenylene sulfide-based resin as the thermoplastic resin of the thermoplastic resin molding material, the molding condition of the thermoplastic resin molding material are as follows. That is, the cylinder temperature is usually from 270 to 370° C. and preferably from 290 to 340° C.; the metal mold temperature is usually from 110 to 180° C., preferably from 120 to 160° C. and more preferably from 125 to 140° C.; the filling time is from about 1 to about 10 s; and the cooling time is usually 150 s or more. The metal mold temperature is preferably controlled by using combination of a heater and pressurized water temperature control for preventing overheating thereof.

In the method (2) in which the coil conductor and the metal bush are inserted into the meal mold to obtain an integrally molded product, various loads are applied to a portion in the vicinity of the respective bolt-tightening portions, i.e., in the vicinity of the metal bush. Therefore, such a portion is required to have a high strength. On the other hand, a branched flow of the resin material caused upon molding is merged into an opening portion (metal bush), thereby forming a weld line.

The weld line tends to cause deterioration in strength owing to orientation of the resin or reinforcing fibers. Therefore, in the vicinity of the metal bush, it is required to avoid formation of the weld line. For this purpose, a disk gate may be provided at the position where the metal bush is disposed, to allow the thermoplastic resin molding material to be filled into the metal mold through the disc gate, in order to avoid occurrence of the merged flow of the branched resin material.

The ground coil device is usually provided with several bolt-tightening portions. Therefore, it is desirable that metal bushes are inserted into all of the bolt-tightening portions, and disk gates are provided thereon to allow the thermoplastic resin molding material to be filled into the metal mold through these disc gates.

For the above reason, when the molding process is in the form of a multi-gate system, there may be employed either a cold runner system using a triple plate metal mold or a hot runner system using a twin plate metal mold.

In the process of the present invention, since the coil conductor as an inert has a large size, in order to facilitate insertion, fixing and removal of the coil conductor relative to the metal mold, the mold clamping device fitted to the injection molding machine used is preferably of such a type as operated in the direction parallel with the gravity direction.

Also, in the process of the present invention, since the coil conductor produced by winding metal wires such as aluminum wires and copper wires into a coil shape has a good strength in a longitudinal direction of the metal wires but a poor strength between the adjacent metal wires, there tends to occur displacement of the metal wires when applying a shear stress thereto.

Therefore, when applying a load to the coil conductor upon injection molding, the coil conductor tends to suffer from deformation or displacement from the desired positions, thereby failing to obtain the aimed ground coil device. For this reason, the coil conductor is preferably subjected to pretreatment for enhancing a rigidity thereof.

As the pretreatment for enhancing a rigidity of the coil conductor, there may be used, for example, the method of enhancing a rigidity of the coil conductor using a thermosetting resin. More specifically, the thermosetting resin may be impregnated between the metal wires of the coil and then hardened. In this method, a tape formed from a fiber-shaped reinforcing material may be wound around an outer periphery of the coil conductor to further enhance a rigidity thereof.

As the fiber-shaped reinforcing material, there may be usually used glass fiber reinforcing materials and synthetic fiber reinforcing materials. As the thermosetting resin, there may be usually used heat-curable epoxy resins and heat-curable polyester resins.

The coil conductor is generally produced by repeatedly winding the metal wires multiple times into a coil shape. Therefore, the dimensional error of the coil conductor tends to be increased several times that of the metal wires, resulting in poor dimensional accuracy of the resultant coil conductor. However, in the present invention, since the coil conductor is impregnated with the thermosetting resin using a mold upon subjecting the coil conductor to the pretreatment for enhancing a rigidity thereof, there can also be obtained such an additional effect of enhancing a dimensional accuracy of the coil conductor.

In the ground coil device, it is required to cover the a whole outer peripheral surface of the coil conductor with the resin material as an insulating material and, therefore, keep the coil conductor in a floated state within the metal mold upon molding.

Therefore, the pins capable of advancing into and retreating from the metal mold are used such that the coil conductor is fixed in the metal mold with the pins moved to the advanced position, thereby allowing the coil conductor to be fixed at a desired position within the metal mold. The pins are usually actuated by using a hydraulic device or a pneumatic device.

In this case, it is important that the coil conductor may be fixed with the pins by applying thereto such a force as not to cause displacement of the coil conductor within the metal mold even when the filling pressure is exerted thereon upon molding. At least the pins contacted with front and back surfaces of the coil conductor are preferably allowed to be still movable with an advancing stroke of from about 1 to about 2 mm. The pins are preferably provided for fixing outer peripheral surfaces (four side surfaces) of the coil conductor as well as front and back surfaces (two surfaces) thereof in the thickness direction.

As to the shape of the tip end of the respective pins, when the tip end has a too small surface contacting with the coil conductor, it tends to be difficult to fix the coil conductor, whereas when the tip end has a too large contact surface, the pins tend to inhibit a flow of the resin material. Therefore, the contact surface area of the tip end of the pins is preferably from about 100 to about 1000 $mm^2$.

The pins preferably have a circular shape in section in order to avoid concentration of stress thereto. The pins having a polygonal shape in section are preferably formed with R at corner portions thereof. Also, when the number of the pins is too small, it tends to be difficult to fix the coil conductor within the metal mold, whereas when the number of the pins is too large, a suitable flow of the resin material tends to be inhibited. Therefore, the number of the pins provided is preferably about 1 per 5000 to 16000 $mm^2$ of the outer peripheral surface (side surfaces) of the coil conductor, and about 1 per 6000 to 30000 $mm^2$ of the front and back surfaces of the coil conductor in the thickness direction.

Further, the pins are preferably contacted with the outer peripheral surface (side surfaces) of the coil conductor at a mid position of the thickness of the coil conductor, whereas the pins are preferably contacted with the front and back surfaces of the coil conductor in the thickness direction at a central position of the coil conductor or on an upstream side of the resin material flow from the center of the coil conductor. More specifically, since the gates for the resin material (bolt-tightening portions=metal bush portions) are frequently disposed on an inner diameter side of the coil conductor owing to the structure of the ground coil device, the pins are also preferably disposed at the center of the coil conductor or on the inner diameter side from the center of the coil conductor.

When the coil conductor is fixed by means of the pins, if the pressure applied to the coil conductor by the pins upon advancing is too high or the coil conductor has a too large thickness owing to a large dimensional error thereof, the coil tends to be damaged by the pins.

Therefore, the respective pins are preferably fitted with an insulating material such that a cushioning member made of the insulating material is interposed between the coil conductor and the pins. The cushioning member usually has an area identical to or larger than a sectional area of the respective pins. When the thickness of the cushioning member interposed between the coil conductor and the pins is too small, the cushioning member tends to fail to exhibit a sufficient buffering effect. When the thickness of the cushioning member interposed between the coil conductor and the pins is too large, the cushioning member tends to inhibit flow of the resin material upon molding. Therefore, the thickness of the cushioning member is from about 1 to about 4 mm.

The cushioning member preferably has a larger area than that of the respective pins and such a shape capable of sandwiching the respective pins therein in order to prevent the cushioning member from being removed from the pins. The cushioning member should be made of a material exhibiting a good adhesion to the thermoplastic resin molding material used upon molding the ground coil device. When the material of the cushioning member has no adhesion to the thermoplastic resin molding material, water tends to be penetrated into the ground coil device from a boundary surface therebetween, so that the obtained coil device is sometimes practically unusable.

The material of the cushioning member preferably contains the same resin as the thermoplastic resin contained in the thermoplastic resin molding material used upon the molding, but is not necessarily made of a material having the same composition as that of the thermoplastic resin molding material.

Figure 4:
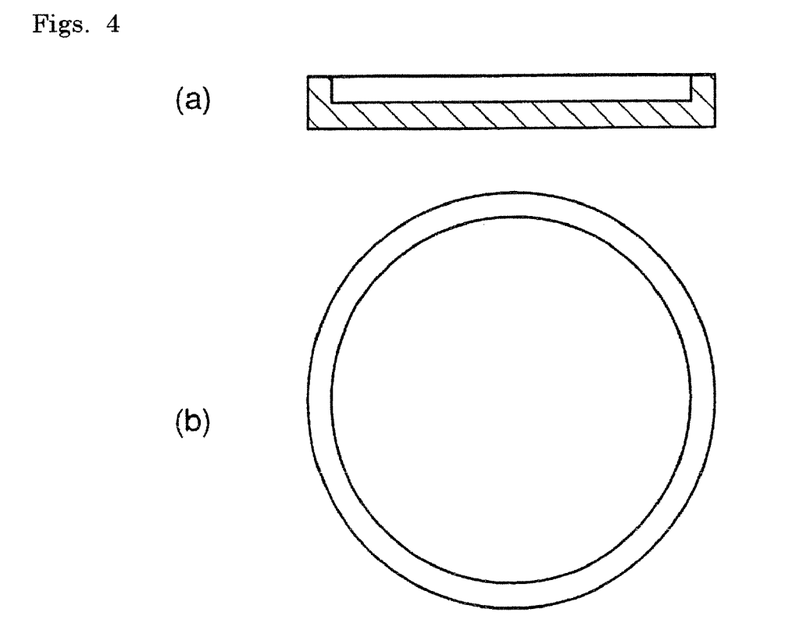
FIG. 4 are a side view and a plan view showing an example of a cushioning member used in the process of the present invention which is made of an insulating material and fitted to a tip end of a pin capable of advancing into and retreating from a metal mold.

FIG. 4 show an example of the cushioning member in which FIG. 4($a$) is a side view thereof and FIG. 4($b$) is a plan view thereof.

In the case where the injection molding is conducted by fixing the coil conductor by means of the pins, holes remain in the resultant molded product at the positions where the pins are located upon molding. When no cushioning member is fitted onto the respective pins, the coil conductor is exposed to the holes formed on the molded product at positions corresponding to the pin-locating portions. Also, even though the cushioning member is fitted onto the respective pins, if the materials of the cushioning member has no sufficient adhesion to the molding material, it is also required to close the resultant holes in a post-treatment after the molding.

In the present invention, to omit the post-treatment and further enhance the productivity, there is usually taken such a measure that the pins are retreated from the metal mold during molding, and the resin material is also filled into the holes formed after retreating the pins. In this case, if the pins are retreated too early, it tends to be difficult to keep the coil conductor being fixed at the desired position. On the other hand, if the pins are retreated too late, the resin material tends to be completely solidified, so that even though the pins are then retreated, it is not possible to fill the resultant holes with the resin material. Therefore, the pins are preferably retreated from coil conductor located in the metal mold within 10 s after the resin material passes by the pins.

The pins may be retreated either individually and separately from each other or at the same time as long as the pins are retreated within the above specified period.

As far as the metal mold is clamped and the coil conductor is fixed therein by means of the pins by contacting the pins with the front and back surfaces of the coil conductor in the thickness direction thereof, it is unlikely that the coil conductor is displaced in the direction of its outer peripheral surface (side surfaces) by an injection filling pressure of the resin material. Therefore, the pins contacting with the outer peripheral surface (side surfaces) of the coil conductor may be retreated before initiation of the injecting molding after completion of claming the metal mold.

Thus, when the thermoplastic resin molding material is filled into a cavity of the metal mold into which the coil conductor and preferably the coil conductor and the metal bush are previously inserted to thereby obtain an integrally molded product, the ground coil device for magnetic levitation railway according to the present invention can be manufactured with a good productivity. The thus manufactured ground coil device for magnetic levitation railway can exhibit a good strength, a good heat resistance, a good weather resistance, etc.

EXAMPLES

The present invention will be described in more detail by referring to the following examples. However, it should be noted that these examples are only illustrative and not intended to limit the invention thereto.

Meanwhile, the respective ground coil devices obtained in the following Examples and Comparative Examples were subjected to measurement of molding cycle, evaluation for appearance of the molded products, measurement of a mass of the resin material portion except for the coil conductor and measurement of a wall thickness of the resin material of the coil conductor portion using an eddy current type displacement sensor. The results were evaluated according to the following ratings.

(1) Molding Cycle
 ○: 5 Min or shorter
 X: Longer than 5 min
(2) Evaluation for Appearance of Molded Product
 ○: No abnormal appearance occurred when visually observed.
 X: Defective appearance owing to generation of gases or defective appearance at flow end portions were visually observed.
(3) Mass of Resin Material Portion Except for Coil Conductor
 ○: 5 Kilograms or less
 Δ: From 5 to 10 kg
 X: More than 10 kg
(4) Wall Thickness of Resin Material of Coil Conductor Portion
 ○: Error within ±0.5 mm relative to the predetermined thickness
 X: Error exceeding ±0.5 mm relative to the predetermined thickness Further, a test for pushing off the metal bush portion was performed by the following method.

(5) Push-off Test for Metal Bush Portion

Figure 5:
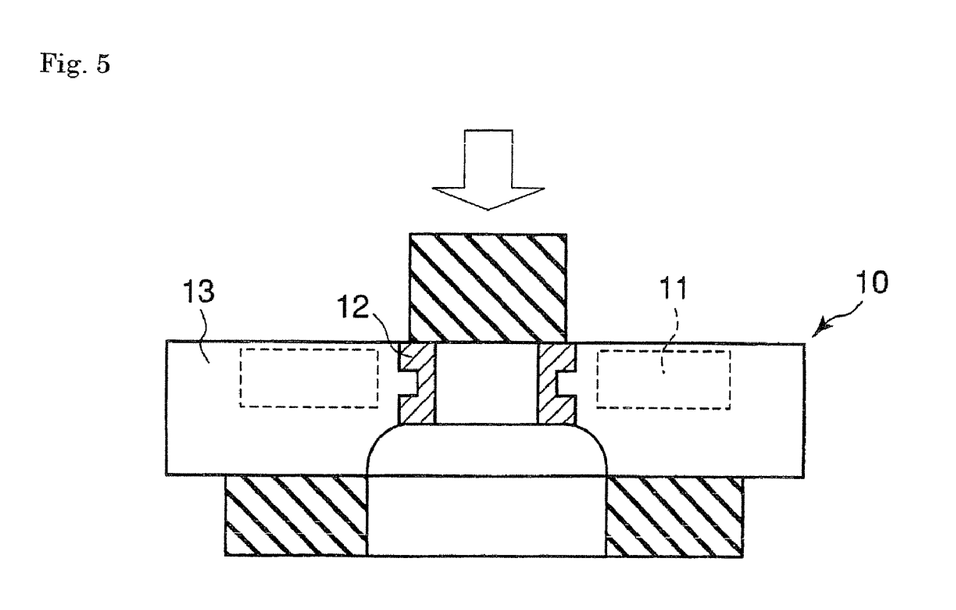
FIG. 5 is an explanatory view showing a testing method for pushing out a metal bush used in the ground coil devices obtained in Examples and Comparative Examples.

As shown in FIG. 5, a load was applied onto a metal bush portion 12 to confirm whether or not any breakage occurred upon applying 150 kN thereto. Meanwhile, in FIG. 5, reference numeral 10 denotes a coil device; 11 denotes a coil conductor; and 13 denotes a resin material.

Production Example 1

A 1 L autoclave was charged with 110.26 g of p-dichlorobenzene, 34.46 g of lithium sulfide, (0 g of trichlorobenzene), 10.09 g of water and 334.21 g of N-methyl-2-pyrrolidone, and the contents of the autoclave were reacted with each other at 260° C. for 3 h in a nitrogen atmosphere, thereby producing a polymer.

The thus produced polymer was separated from the reaction solution, washed with N-methyl-2-pyrrolidone and then with water and acetone, and then dried under reduced pressure at 120° C. for 8 h. As a result, it was confirmed that the resultant polymer (polyphenylene sulfide: PPS) had a melt viscosity of 100 Pa·s as measured at 300° C. and 200 s$^{-1}$ and a flexural modulus of 112 MPa as measured according to ASTM D790.

Example 1

A conductor (made of an aluminum material) around which was wound a prepreg-like insulating tape prepared by impregnating an insulating tape constituted of a heat-resistant Tetron-based synthetic fiber as a warp and a glass fiber as a weft with an epoxy-based thermosetting resin, was wound into a coil shape to obtain a coil conductor. The thus obtained coil conductor was baked at 100° C. under a pressure of 2 kN/cm$^2$ to harden the semi-cured resin, and solidified into a predetermined dimension.

Next, a metal mold fitted with pins for fixing the coil conductor (each having a cylindrical shape with a diameter of 20 mm; two pins on each of the outer peripheral surfaces (side surfaces) of the coil conductor and 8 pins on each of the front and back surfaces of the coil conductor in the thickness direction) which were capable of advancing into and retreating from the metal mold by means of a hydraulic cylinder, was mounted to an injection molding machine equipped with a vertically-opening type mold clamping device. After raising a temperature of the metal mold to 130° C., the baked and solidified coil conductor was inserted together with the metal bush as shown in FIG. 3 (cylindrical portion: outer diameter: 42 mm, inner diameter: 28 mm, length: 22 mm; outer diameter of upper jaw: 52 mm; outer diameter of lower jaw: 58 mm; thickness of each jaw: 5 mm) into the metal mold, and then the pins were advanced into the metal mold to fix the coil conductor therein.

After completion of claming the metal mold, the pins contacting the four outer peripheral side surfaces of the coil conductor were retreated therefrom, and a thermoplastic resin molding material containing 100 parts by mass of PPS obtained in Production Example 1 and 67 parts by mass of a glass fiber (tradename "JAFT591" available from Asahi Glass Fiber Co., Ltd.; 11 μm) whose temperature was adjusted to a cylinder temperature of 330° C. was filled into the metal mold through a disk gate disposed in a metal bush portion thereof. Three seconds after change-over of the dwell pressure, the remaining pins were retreated from the coil conductor. After cooling for 100 s, the metal mold was opened to take out the obtained molded product (coil device) from the metal mold. The mold cycle and characteristics of the obtained coil device are shown in Table 1.

Figure 6:
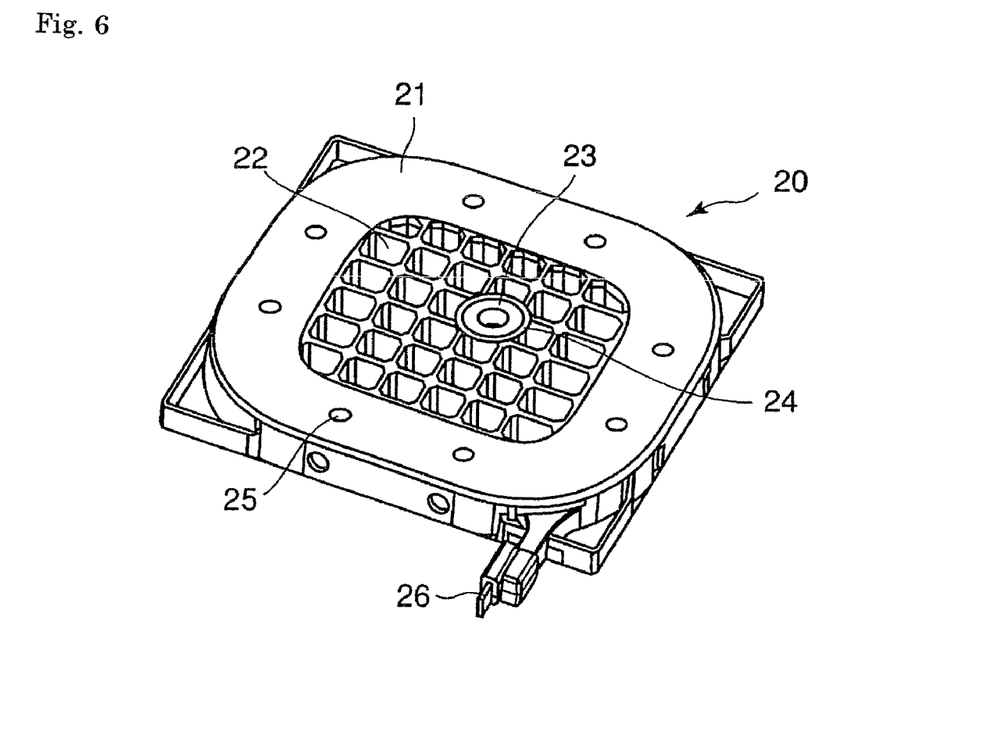
FIG. 6 is a perspective view showing the ground coil device obtained in Example 1.

In addition, a perspective view of the thus obtained coil device is shown in FIG. 6.

In FIG. 6, reference numeral 20 denotes the coil device; 21 denotes a front-side resin surface of the resin-coated coil device; 22 denotes an inner diameter portion of the coil device; 23 denotes the metal bush; 24 is a boss-shaped resin material portion; 25 denotes traces of the pins (closed with the resin material); and 26 denotes a connecting portion to an electric power source.

Example 2

The same procedure as in Example 1 was repeated except that the cushioning member as shown in FIG. 4 which was previously molded from an insulating material (the same material as the thermoplastic resin molding material) was fitted to a tip end of the respective pins for fixing the coil conductor, thereby obtaining a coil device. Meanwhile, the cushioning member had a concave portion having an outer diameter of 25 mm and an inner diameter of 20 mm, and a bottom portion having a thickness of 2 mm, and a thickness of an outside portion thereof was 3.5 mm.

The mold cycle and characteristics of the obtained coil device are shown in Table 1.

Example 3

The same procedure as in Example 1 was repeated except for using a thermoplastic resin molding material containing 100 parts by mass of PPS obtained in Production Example 1, 86 parts by mass of a glass fiber (tradename "JAFT591" available from Asahi Glass Fiber Co., Ltd.; 11 μm) and 14 parts by mass of an elastomer (tradename "TOUGH-TEC H1031" available from Asahi Chemicals Co., Ltd.), thereby obtaining a coil device.

The mold cycle and characteristics of the obtained coil device are shown in Table 1.

Comparative Example 1

The same procedure as in Example 1 was repeated except for using a thermoplastic resin molding material containing 100 parts by mass of PPS obtained in Production Example 1, 96 parts by mass of a glass fiber (tradename "JAFT591" available from Asahi Glass Fiber Co., Ltd.; 11 μm) and 27 parts by mass of an elastomer (tradename "TOUGH-TEC H1031" available from Asahi Chemicals Co., Ltd.), thereby obtaining a coil device.

The mold cycle and characteristics of the obtained coil device are shown in Table 1.

Comparative Example 2

The same procedure as in Example 1 was repeated except for using a thermoplastic resin molding material containing 100 parts by mass of PPS obtained in Production Example 1, 232 parts by mass of a glass fiber (tradename "JAFT591" available from Asahi Glass Fiber Co., Ltd.; 11 μm) and 25 parts by mass of an elastomer (tradename "TOUGH-TEC H1031" available from Asahi Chemicals Co., Ltd.), thereby obtaining a coil device.

The mold cycle and characteristics of the obtained coil device are shown in Table 1.

Comparative Example 3

The SMC material (tradename "1000" available from Asahi Fiber Glass Co., Ltd.; matrix: unsaturated polyester; glass fiber: containing 30% by mass of a random glass fiber mat) was used.

Figure 7:
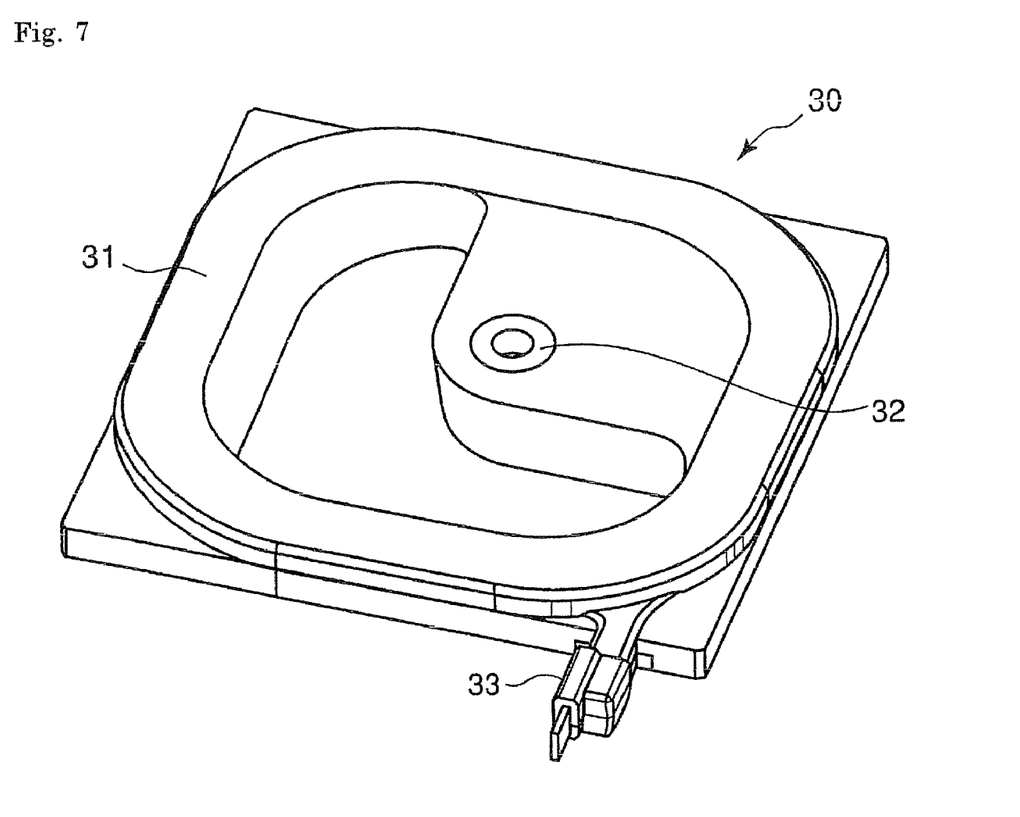
FIG. 7 is a perspective view showing the ground coil device obtained in Comparative Example 3.

The coil conductor subjected to the same treatment as in Example 1 was wrapped with the above SMC material, and the SMC-wrapped coil conductor was accommodated in a metal mold and heated and pressed at 130° C. under a pressure of 120 kN/cm², thereby producing the coil device as shown in FIG. 7.

In FIG. 7, reference numeral 30 denotes the coil device; 31 denotes a surface of the cured SMC material covering the coil conductor; 32 denotes the metal bush; and 33 denotes a connecting portion to an electric power source.

The mold cycle and characteristics of the obtained coil device are shown in Table 1.

INDUSTRIAL APPLICABILITY

The ground coil device for magnetic levitation railway according to the present invention is obtained by coating a coil conductor with a thermoplastic resin molding material having a specific composition, and can be manufactured with a high productivity and can exhibit a reduced weight and a good recyclability.

The invention claimed is:

1. A ground coil device for a magnetic levitation railway affixed to a side wall of a concrete track, comprising:
   a coil conductor covered with a thermoplastic resin molding material having (A) 100 parts by mass of a thermoplastic resin, (B) from 20 to 200 parts by mass of an inorganic filler, and (C) from 0 to 25 parts by mass of an elastomer; and
   a metal bush embedded in the ground coil device at a position corresponding to a fitting bolt for mounting the ground coil device to the side wall of the concrete track,
   wherein the ground coil device has a boss-shaped portion corresponding to the fitting bolt for mounting the ground coil device to the side wall of the concrete track, and 8 or more ribs each having a thickness of from 1.5 to 10 mm at a tip end thereof and a height of 30 mm or more that are connected to the boss-shaped portion.

2. A process for manufacturing a ground coil device for a magnetic levitation railway, the ground coil device affixed to a side wall of a concrete track, the ground coil device having a coil conductor covered with a thermoplastic resin molding material having (A) 100 parts by mass of a thermoplastic resin, (B) from 20 to 200 parts by mass of an inorganic filler, and (C) from 0 to 25 parts by mass of an elastomer, the process comprising:
   filling the thermoplastic resin molding material into a cavity of a metal mold into which the coil conductor is previously inserted, by an injection molding method, to obtain an integrally molded product,
   wherein the coil conductor is fixed in the metal mold by pins configured to advance into and retreat from the metal mold, and wherein the pins configured to advance into and retreat from the metal mold are each fitted at a tip end thereof with an insulating member.

3. The ground coil device for a magnetic levitation railway according to claim 1, wherein the thermoplastic resin as the component (A) of the thermoplastic resin molding material is a polyarylene sulfide-based resin.

TABLE 1

|  | Molding cycle | Evaluation for appearance | Mass of resin portion | Measurement of wall thickness (error relative to predetermined thickness) | Push-off test |
|---|---|---|---|---|---|
| Example 1 | ○ (5 min) | ○ | ○ (5 kg) | ○ (±0.5 mm) | Not broken |
| Example 2 | ○ (5 min) | ○ | ○ (5 kg) | ○ (±0.5 mm) | Not broken |
| Example 3 | ○ (5 min) | ○ | ○ (5 kg) | ○ (±0.5 mm) | Not broken |
| Comparative Example 1 | ○ (5 min) | X (poor appearance due to generation of gases) | ○ (5 kg) | ○ (±0.5 mm) | Not broken |
| Comparative Example 2 | ○ (5 min) | X (short shot at flow ends) | Δ (5.5 kg) | ○ (±0.5 mm) | Not broken |
| Comparative Example 3 | X (30 min) | ○ | X (10 kg) | X (±1.5 mm) | Not broken |

4. The ground coil device for a magnetic levitation railway according to claim 1, wherein the inorganic filler as the component (B) of the thermoplastic resin molding material has a fiber shape, a spherical shape, a plate shape, or an amorphous shape.

5. The ground coil device for a magnetic levitation railway according to claim 1, wherein the device has a generally flat surface on a side facing a vehicle and a swelled surface corresponding to a shape of the coil conductor on a side facing the side wall, and comprises ribs disposed in an inner diameter portion of the coil conductor.

6. The ground coil device for a magnetic levitation railway according to claim 1, wherein the metal bush includes opposite ends thereof with jaws having different diameters from each other.

7. The process according to claim 2, wherein the process is conducted using an injection molding machine equipped with a mold clamping device that is operated in a direction parallel with a gravity direction.

8. The process according to claim 2, wherein the coil conductor comprises coil wires fixedly bonded together with a thermosetting resin.

9. The process according to claim 2, wherein after the thermoplastic resin molding material is filled into the cavity of the metal mold before a temperature of the thermoplastic resin molding material is decreased below a temperature at which the molding material is flowable, the pins are retreated from the metal mold, and portions from which the pins are retreated are filled with the thermoplastic resin molding material to produce a stepless molded product.

* * * * *